(12) United States Patent
Atkins

(10) Patent No.: US 6,193,327 B1
(45) Date of Patent: Feb. 27, 2001

(54) WHEEL SPIN-AND-BRAKE ALGORITHM FOR A REAR WHEEL ANTI-LOCK BRAKE SYSTEM

(75) Inventor: Thomas M. Atkins, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/471,725

(22) Filed: Dec. 23, 1999

Related U.S. Application Data

(63) Continuation of application No. PCT/US98/13791, filed on Jul. 1, 1998.
(60) Provisional application No. 60/051,470, filed on Jul. 1, 1997.

(51) Int. Cl.$^7$ .................................................. B60T 8/34
(52) U.S. Cl. ......................................... 303/113.1; 303/168
(58) Field of Search .............................. 303/113.1, 149, 303/119.1, DIG. 8, 195, 113.5, 61, 68, DIG. 4, 167, 168; 188/181 R

(56) References Cited

U.S. PATENT DOCUMENTS

| | | |
|---|---|---|
| 4,418,966 | 12/1983 | Hattwig . |
| 4,668,023 | 5/1987 | Every et al. . |
| 4,673,226 | 6/1987 | Every et al. . |
| 4,790,607 * | 12/1988 | Atkins .......................... 188/181 R X |
| 4,828,335 * | 5/1989 | Fuller et al. ....................... 188/181 R |
| 4,865,399 | 9/1989 | Atkins et al. . |
| 4,886,322 * | 12/1989 | Atkins .......................... 188/181 R X |
| 4,886,332 | 12/1989 | Atkins . |
| 5,043,897 * | 8/1991 | Yoshino ........................... 303/168 X |

FOREIGN PATENT DOCUMENTS

| | | |
|---|---|---|
| 27 40 419 | 3/1979 | (DE) . |
| 38 20 440 | 1/1989 | (DE) . |
| 39 37 719 | 6/1990 | (DE) . |
| 2 176 557 | 12/1987 | (GB) . |

* cited by examiner

*Primary Examiner*—Robert J. Oberleitner
*Assistant Examiner*—Melanie Talavera

(57) ABSTRACT

The speed of a controlled wheel in a rear wheel anti-lock brake system is monitored during a spin-and-brake condition. Acceleration of the rear wheel following a string of dump pulses is an indication that the spin-and brake condition ended before the vehicle brakes were applied. A lack of acceleration of the rear wheel following a string of dump pulses is an indication that the spin-and-brake condition is present.

11 Claims, 5 Drawing Sheets

WHEEL SPIN-AND-BRAKE ALGORITHM FOR A REAR WHEEL ANTI-LOCK BRAKE SYSTEM

CROSS REFERENCE TO RELATED APPLICATIONS

This application claims the benefit of U.S. Provisional Application No. 60/051,470, filed Jul. 1, 1997 and is a continuation of International Patent Application No. PCT/US98/13791 filed Jul. 1, 1998.

BACKGROUND OF THE INVENTION

This invention relates in general to anti-lock brake systems and in particular to a spin-and-brake algorithm which includes a test to verify that the vehicle is actually in a spin-and-brake situation.

An Anti-lock Brake System (ABS) is often included as standard or optional equipment on new vehicles. When actuated, the ABS is operative to control the operation of some or all of the vehicle wheel brakes. One type of ABS controls only the vehicle rear wheel brakes. Such a system is referred to as a Rear Wheel Anti-Lock Brake System (RWAL) the following.

A typical prior art RWAL is illustrated generally at 10 in FIG. 1. As shown in FIG. 1, the RWAL 10 is installed on a vehicle having a hydraulic braking system consisting of a brake pedal 12 coupled to operate a dual reservoir master cylinder 14. When the vehicle operator depresses the brake pedal 12, the master cylinder 14 supplies hydraulic fluid under pressure from a front reservoir 14a through a hydraulic line 16a and from a rear reservoir 14b through a hydraulic line 16b to a conventional combination or proportioning valve 18. The combination valve 18 includes a first output line 18a adapted to supply hydraulic fluid at a first predetermined pressure to actuate a pair of vehicle front wheel brakes 19a and 9b. The combination valve 18 also includes a second output line 18b which supplies hydraulic fluid at a second predetermined pressure to actuate a pair of vehicle rear wheel brakes 20a and 20b.

The RWAL 10 shown in FIG. 1 utilizes a control valve 21 to selectively control the application of pressure to the rear wheel brakes 20a and 20b when the system is in an anti-lock braking mode. The control valve 21 includes a normally open solenoid valve 22 connected between the line 18b and a line 24 which supplies pressurized brake fluid to the controlled rear wheel brakes 20a and 20b. During an anti-lock braking cycle, the normally open valve 22 isolates the rear wheel brakes 20a and 20b from the master cylinder 14 and is commonly referred to as an isolation valve. The isolation valve 22 also can be selectively opened to increase the pressure at the rear wheel brakes 20a and 20b.

The control valve 21 also includes a normally closed solenoid valve 26, which is connected between the line 24 and a fluid accumulator 28. The normally closed valve 26 is commonly referred to as a dump valve. The dump valve 26 is selectively opened to reduce the pressure at the rear wheel brakes 20a and 20b by bleeding brake fluid from the rear wheel brakes to the accumulator 28. In the RWAL 10, the master cylinder 14 provides a source of pressurized hydraulic brake fluid during an anti-lock braking cycle, thus eliminating the need for a separate source of pressurized hydraulic fluid, such as a motor driven pump, which is usually included in a four wheel ABS.

The RWAL 10 further includes a computer control module 30 which is electrically connected to a wheel speed sensor 40. The control module 30 can be mounted directly upon the control valve 21 or located remotely therefrom. The control module 30 includes a RWAL microprocessor (not shown) which is programmed to control the RWAL 10 in accordance with a RWAL control algorithm and parameters permanently stored in a Read Only Memory (ROM). The RWAL microprocessor also can access a Random Access Memory (RAM) for temporary storage and retrieval of data. A detailed description of the RWAL illustrated in FIG. 1 is included in U.S. Pat. Nos. 4,790,607 and 4,886,322.

During vehicle operation, the microprocessor in the RWAL control module 30 continuously receives speed signals from the wheel speed sensor 40. The RWAL microprocessor monitors the speed signals for potential rear wheel lock-up conditions. When the vehicle brakes are applied and the RWAL microprocessor senses a first rear wheel speed departure, which is indicative of an impending wheel lock-up condition, the RWAL microprocessor is responsive thereto to close the isolation valve 22 to isolate the rear wheel brakes 20a and 20b from the master cylinder 14. The RWAL microprocessor then selectively opens the dump valve 26 to reduce the pressure applied to the rear wheel brakes 20a and 20b and thereby correct the rear wheel speed departure. Once the wheel speed departure has been corrected and the controlled wheel has spun up to the vehicle speed, the microprocessor opens the isolation valve 22 to initiate a second wheel speed departure.

The operation of the RWAL 10 is illustrated by the graphs shown in FIG. 2. The upper solid curve labeled 60 represents the velocity of the rear wheels while the dashed curve labeled 61 represents the vehicle velocity. The operation of the isolation valve 22 and the dump valve 26 is illustrated by the curves labeled 62 and 63, respectively. The lower curve, which is labeled 64, shows the pressure applied to the controlled rear wheel brakes. During an anti-lock braking cycle, the first and second wheel speed departures are labeled 60a and 60b, respectively. Following correction of the second wheel speed departure, which occurs at time $t_7$, the rear wheel brake pressure is maintained at a constant level $P_e$.

With a RWAL system, it is necessary to identify and respond to a situation in which the vehicle operator has used the accelerator to spin the vehicle rear wheels faster than the actual vehicle speed and then steps on the brake pedal. Accordingly, if the brake pedal is depressed and the anti-lock braking mode entered while a rear wheel overspin condition exists, a "spin-and-brake" mode of RWAL operation is entered and a rear wheel overspin condition exists, as shown by the upper curve in FIG. 3. FIG. 3 also illustrates the operation of the isolation and dump valves 22 and 26 and the resulting pressure applied to the controlled wheel brakes vs. time.

In the spin-and-brake mode, the RWAL system control algorithm provides two cycles of pressure dumping followed by unlimited reapply until wheel speed departures are forced, as illustrated in FIG. 3. In FIG. 3, the upper curve 80 represents the actual rear wheel speed while the dashed curve 84 represents the actual vehicle speed. During the portion labeled 80a, the rear wheel speed is accelerated above the vehicle speed.

The RWAL control algorithm detects conditions which indicate that the vehicle has entered a spin-and-brake mode of operation. For example, if the rear wheel speed is 0.5 g greater than the projected vehicle speed ramp for more than 0.5 seconds, the ABS control algorithm sets a Spin-and-Brake (SPNBRK) flag TRUE. The SPNBRK flag is held TRUE for a relatively long predetermined time period, such as, for example 16 seconds. The long time out period for the SPNBRK flag compensates for the possibility that the rear wheel overspin continues at a nearly constant velocity for several seconds. Once the predetermined time period has elapsed, the SPNBRK flag is cleared. When the SPNBRK flag is TRUE, the control algorithm will enter the spin-and-brake mode upon application of the wheel brakes and entry into the anti-lock brake mode.

In FIG. 3, the SPNBRK flag is set TRUE during the portion of the curve labeled 80a. When vehicle brakes are applied at time $t_a$, the RWAL control algorithm projects a speed ramp 86 and the wheel speed then decreases from the original overspin to actual vehicle speed while brake pressure is kept very low. In most instances, the pressure applied to the controlled rear wheel brakes, $B_1$, is very close to zero. However, in order to illustrate the subsequent pressure reductions, $B_1$ is shown above zero pressure in FIG. 3.

At tc, a first set of dump pulses 83a are generated to deal with a false wheel speed departure which occurs as the rear wheel speed decreases from the original overspin condition to the actual wheel speed. The RWAL control algorithm will then, at time $t_d$, enter a "spin-and-brake" reapply mode and generate a first string of reapply pulses, which are labeled 82a, to cause a first real wheel speed departure cycle 80b. Also, at this time, the projected speed ramp 86 is reinitialized as a new projected speed ramp 87 at the present vehicle speed. After generating the spin-and-brake reapply pulses 82a to increase the pressure applied to the controlled rear wheel brakes 20a and 20b to a level $B_3$, a series of dump pulses 83b are produced to reduce the pressure to $B_4$ and correct the slip condition in the first real wheel speed departure cycle 80b. Next, one or more automatic reapply pulses 82b are generated to cause a second real wheel speed departure cycle 80c and increase the pressure to a level $B_5$. Finally, a dump pulse 83b is generated to correct the slip condition in the second real wheel speed departure 80c and reduce the pressure to a level $B_6$ for the remainder of the vehicle stop. A detailed description of the spin-and-brake mode of operation is included in the above-identified U.S. Pat. No. 4,790,607.

SUMMARY OF THE INVENTION

This invention relates to a spin-and-brake algorithm which includes a test to verify that the vehicle is actually in a spin and brake situation.

As described above, a RWAL control algorithm includes a spin-and-brake response for rear wheel overspin caused by the vehicle operator depressing the accelerator on a low mu surface and then applying the brakes. There is a possibility that the rear wheel overspin condition occurred within the time out period for the SPNBRK flag and before the beginning of a vehicle stop, but ceased early enough to allow the projected vehicle ramp to decay to actual vehicle speed before the brake pedal is depressed. In this situation, the SPNBRK flag is still set TRUE at the beginning of the braking cycle, but a real spin-and-brake condition does not actually exist. Because the SPNBRK flag is set TRUE, the RWAL control algorithm will generate two cycles of pressure release and unlimited reapply where only one cycle is actually needed. The extra release and reapply cycle bleeds pressurized brake fluid from the master cylinder. As was described above, the RWAL brake system is passive, having no pump to supply pressurized brake fluid. Accordingly, it would be desirable to eliminate the second release and reapply cycle to conserve the pressurized brake fluid when an actual spin-and-brake situation does not exist.

The present invention contemplates an anti-lock brake system for a vehicle having at least one wheel brake connected to a master cylinder. The anti-lock brake system includes an isolation valve connected between the master cylinder and the controlled wheel brake and a dump valve connected to the rear wheel brake. Additionally, the system has a speed sensor for monitoring the speed of a rear wheel associated with the controlled rear wheel brake. The system further includes a controller electrically coupled to the isolation and dump valves and the speed sensor. Following detection of an over-speed condition of the wheel associated with the controlled wheel brake and an actuation of the controlled wheel brake which causes a deceleration of the wheel, which is indicative of a potential lock-up thereof, the controller selectively opens the dump valve. The controller then monitors the speed of the wheel associated with the controlled wheel brake to determine if a spin-and-brake condition exists at the wheel.

In the preferred embodiment, the controller is operative, following the actuation of the controlled wheel brake, to monitor the deceleration of the wheel associated with the controlled wheel brake. The controller is further operative, upon detection of a predetermined wheel deceleration value, to monitor the speed of the wheel for a predetermined time period to determine whether the spin-and-brake condition actually exists at the wheel. In the preferred embodiment, the value for the predetermined deceleration is zero.

The determination of existence of a spin-and-brake condition includes calculating the change in speed of the wheel associated with the controlled wheel brake during a predetermined time period and comparing the change in wheel speed to a predetermined wheel speed change threshold. The controller is operative upon determining that the change in wheel speed is less than the threshold to implement a spin-and-brake control algorithm for controlling the rear wheel speed. Alternately, the controller also is operative upon determining that the change in controlled wheel speed is greater that the threshold to clear a spin-and-brake flag. The controller then continues the braking cycle in a normal RWAL operational mode for controlling the rear wheel speed. In the preferred embodiment, the controlled wheel brake is a rear wheel brake.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

The present invention contemplates an improved spin-and-brake algorithm having the reinitialization of the projected vehicle speed ramp delayed by a short time period for a test to confirm that a spin-and-brake condition actually exists. The delay allows comparison of the rear wheel speed at the beginning of a predetermined time period, $T_P$, which is 200 milliseconds in the preferred embodiment, to the rear wheel speed at the end of the time period $T_P$. During a normal anti-lock brake cycle, the rear wheel speed will have begun to recover and will be accelerating toward actual wheel speed at the end of the time period $T_P$. Accordingly, if the change in rear wheel speed has increased during the time period $T_P$ and the increase exceeds a moderate predetermined rear wheel speed increase threshold $V_T$, then the SPNBRK flag is cleared and the normal anti-lock brake algorithm is used for the braking cycle. Accordingly the projected speed ramp is not reinitialized. In the preferred embodiment, the rear wheel speed increase threshold $V_T$ is five miles per hour; however, other values can be used for the threshold $V_T$.

If the change in rear wheel speed has not increased by an amount greater than the rear wheel speed increase threshold $V_T$, then the initial wheel speed decrease corresponds to the false wheel speed departure described above for the wheel overspin condition. This indicates that an actual overspin condition is present and the control algorithm should enter the mode of spin-and-brake operation. Accordingly the SPNBRK flag is not cleared. Thus, for a situation in which there is an actual rear wheel overspin condition, the improved algorithm provides an appropriate spin-and-brake response with a small delay before starting the first set of reapply pulses.

Figure 1:
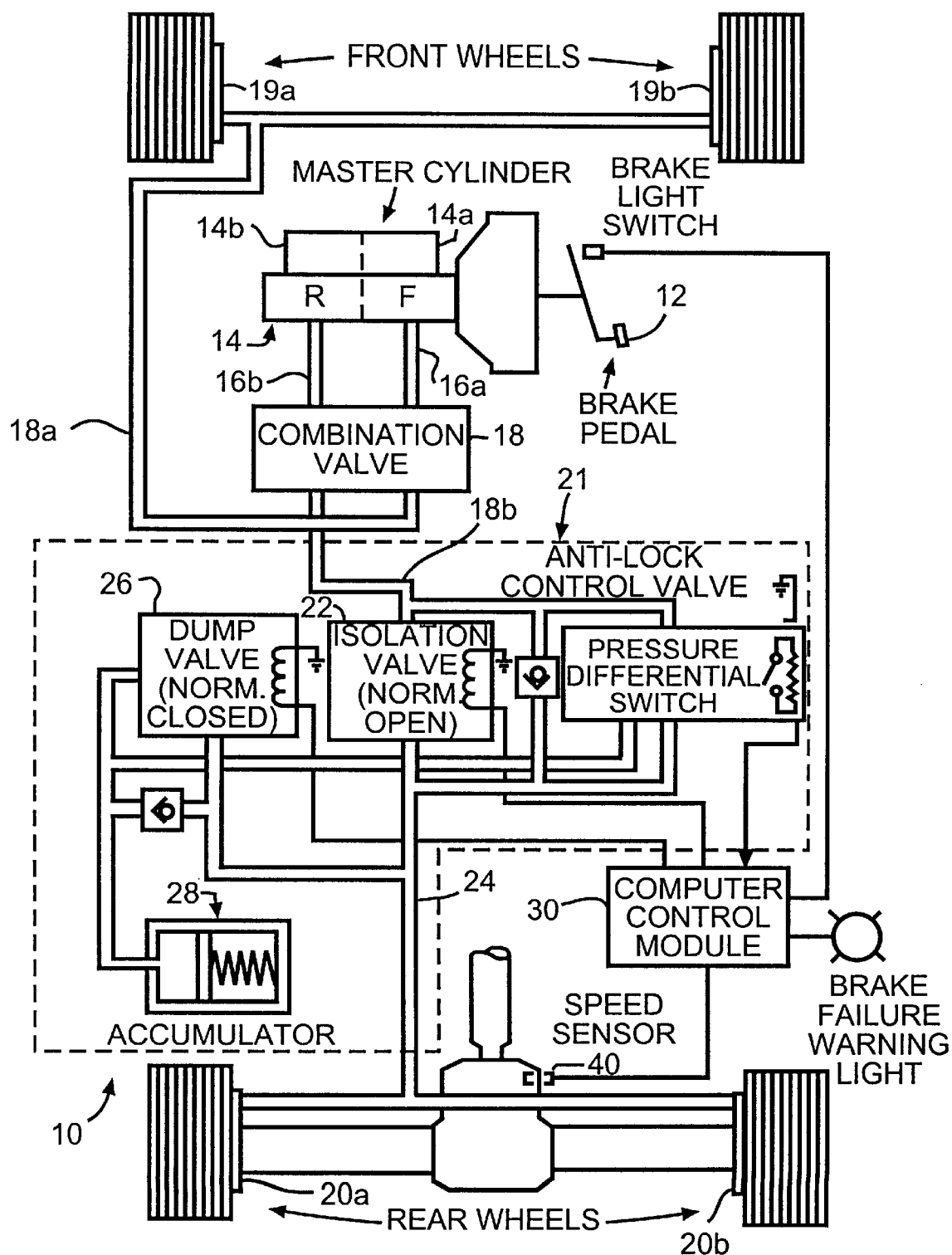
FIG. 1 is a schematic diagram of a prior art passive rear wheel anti-lock brake system.
Figure 2:
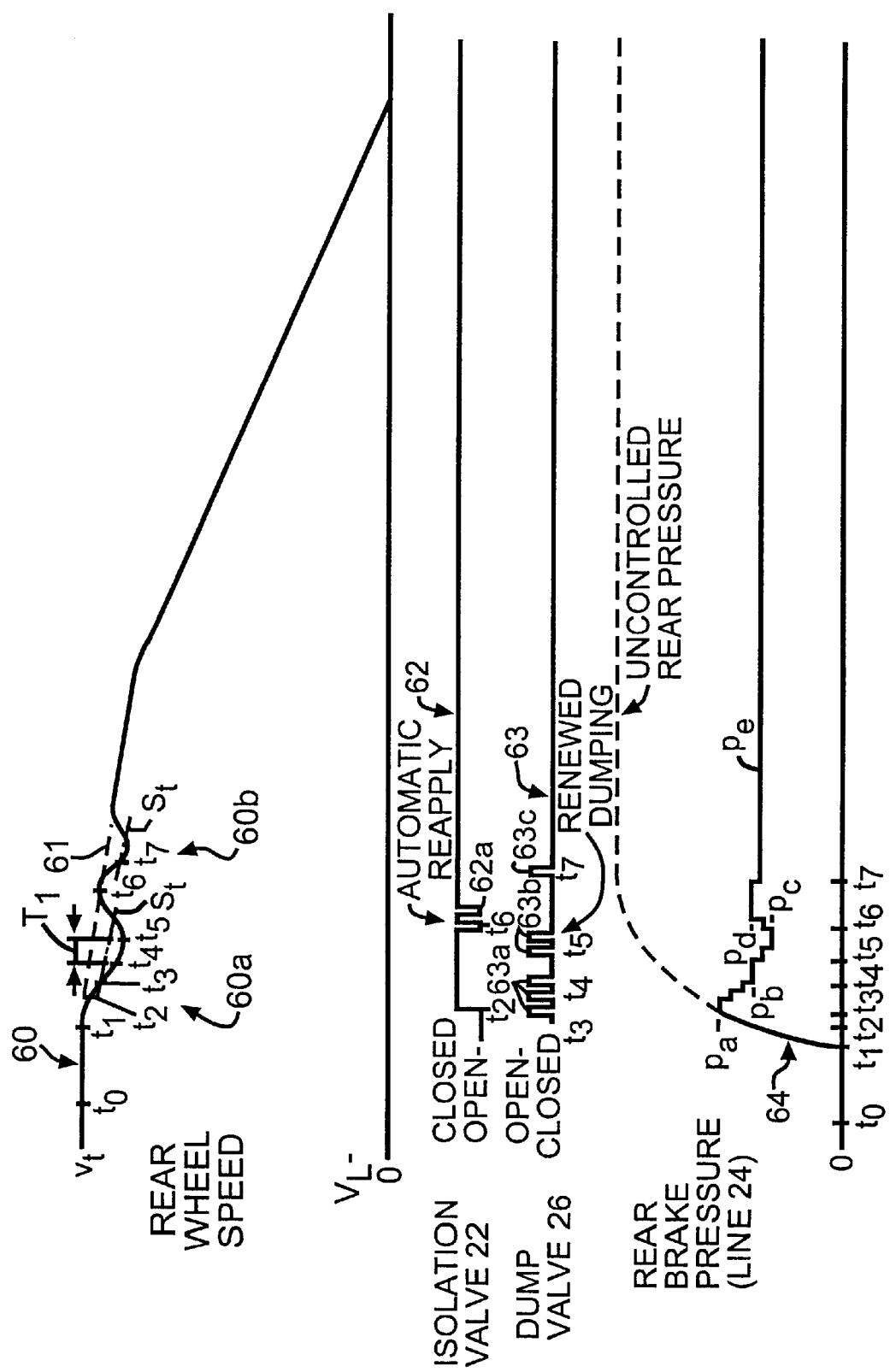
FIG. 2 illustrates the operation of the rear wheel anti-lock brake system shown FIG. 1.
Figure 3:
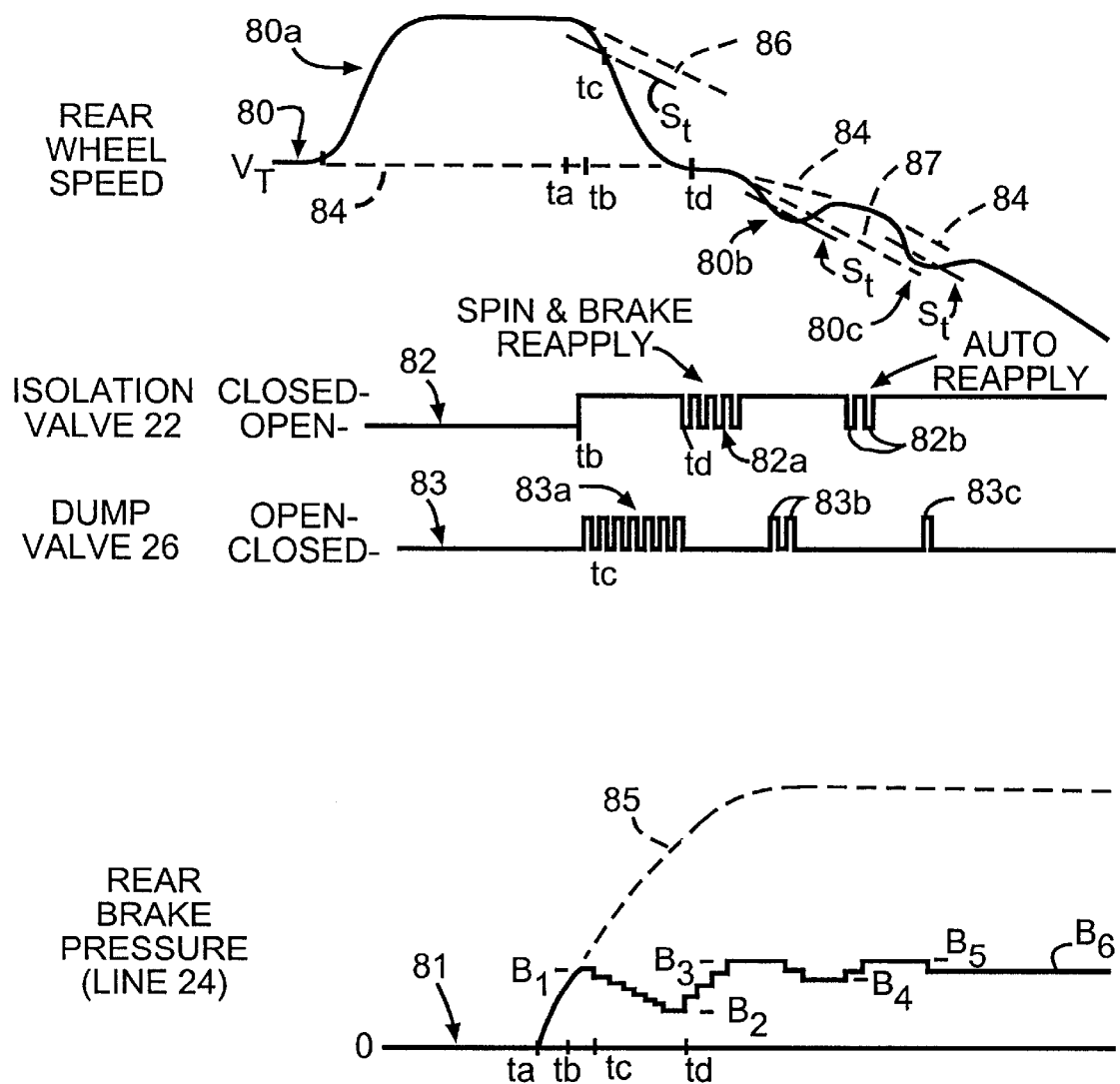
FIG. 3 illustrates a spin-and-brake mode of operation for the rear wheel anti-lock brake system shown in FIG. 1.

For a normal anti-lock brake cycle in which the SPNBRK flag is misleadingly set at the beginning of the brake cycle, the improved algorithm results in anti-lock control that is exactly the same as if the SPNBRK flag were not initially set. The present invention is illustrated by the rear wheel speed vs. time graph shown in FIG. 4. Components of the graphs shown in FIG. 4 which are similar to components of the graphs shown in FIG. 3 have the same numerical designators. Accordingly, the solid line labeled 80 represents the rear wheel speed while the dashed line 84 represents the actual vehicle speed. FIG. 3 also illustrates the operation of the isolation and dump valves 22 and 26.

At $t_1$, the vehicle operator depresses the accelerator pedal while the vehicle is on a low mu road surface. The rear wheels overspin, as can happen upon accelerating on a slippery surface. At $t_2$, the algorithm senses that the rear wheel acceleration has exceeded a predetermined threshold for a predetermined time period of time, such as 0.5 g greater than the projected speed ramp for more than 0.5 seconds. Accordingly, the algorithm sets the SPNBRK flag TRUE. Unless reset, the SPNBRK flag will remain TRUE for a predetermined SPNBRK time period $T_{SB}$, which is 16 seconds in the preferred embodiment. As shown by the portion of the graph labeled 90 in FIG. 4, the vehicle operator releases the accelerator at $t_3$ and the rear wheel speed decays to the actual vehicle speed well before the predetermined SPNBRK time period $T_{SB}$ has expired.

Normally, the SPNBRK flag will time out before the vehicle brakes are applied. However, in FIG. 4, soon after the rear wheel speed returns to the actual vehicle speed, the vehicle operator applies the brakes at $t_4$. Due to the slippery road surface, the rear wheel begins to decelerate more rapidly than the vehicle. At $t_5$, the ABS microprocessor initiates an anti-lock brake cycle by closing of the isolation valve 22 and selectively opening the dump valve 26 as shown by the string of dump pulses labeled 83$d$. In response, the rear wheel speed begins to recover. At $t_6$, the rear wheel deceleration reaches zero and the wheel begins to accelerate. When the rear wheel deceleration passes through zero, a timer is started and the rear wheel speed is sensed and stored in the RWAL microprocessor memory. At the end of a predetermined time period $T_P$, which occurs at $t_7$, the rear wheel speed is sensed and compared to the rear wheel speed at $t_6$. As indicated above, in the preferred embodiment, $T_P$ is 200 milliseconds; however, other lengths of time also can be used for $T_P$. The difference between the wheel speeds is shown as $V_D$. If $V_D$ exceeds the predetermined rear wheel speed increase threshold $V_T$, which is five miles per hour in the preferred embodiment, the RWAL microprocessor recognizes that a real wheel speed departure cycle has occurred and not a false wheel speed departure as illustrated in FIG. 3. Accordingly, the SPNBRK flag is cleared and a normal RWAL brake cycle follows with a string of auto reapply pulses 82$c$ generated at $t_8$ to cause a second wheel speed departure. The second wheel speed departure is then followed by a string of dump pulses 83$e$.

Figure 4:
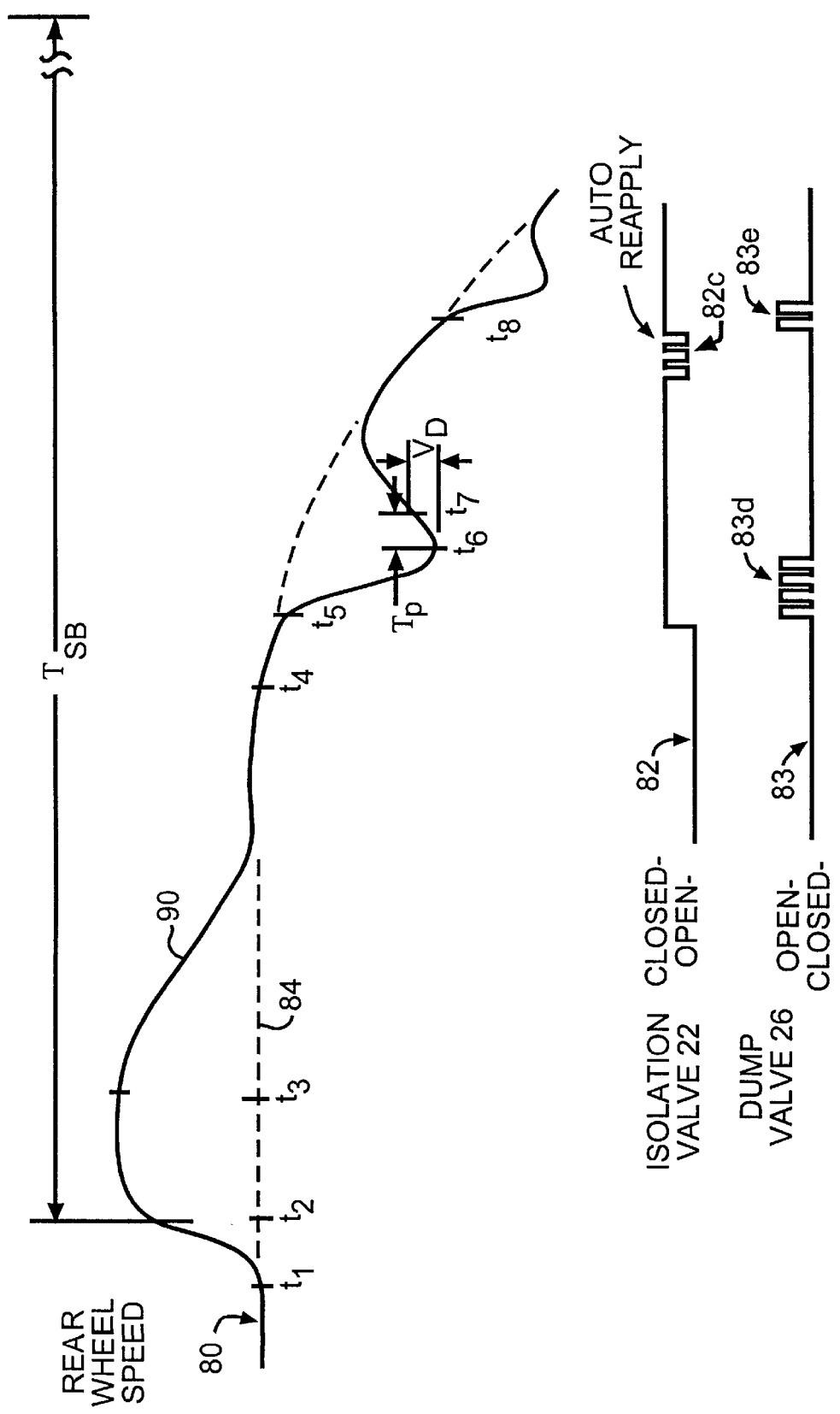
FIG. 4 is a wheel speed vs. time graph illustrating the present invention.

During a conventional spin-and-brake situation, the initial set of dump pulses would return the wheel speed to the vehicle speed, as shown in FIG. 3 at $t_d$. Thus, while the acceleration of the rear wheel, is zero at $t_d$ in FIG. 3, the rear wheel would not accelerate following $t_d$ as shown at $t_6$ in FIG. 4. Accordingly, $V_D$ not exceeding the threshold at $t_7$ is an indication that a conventional spin-and-brake cycle is present. The RWAL control algorithm is then responsive to retain the SPNBRK flag in a TRUE condition a conventional spin-and-brake cycle follows, as described above and illustrated in FIG. 3. A comparison of FIGS. 3 and 4 shows that the present invention eliminates one set of dump and apply pulses when a spin-and-brake condition does not actually exist at the time that the vehicle brakes are applied.

Figure 5:
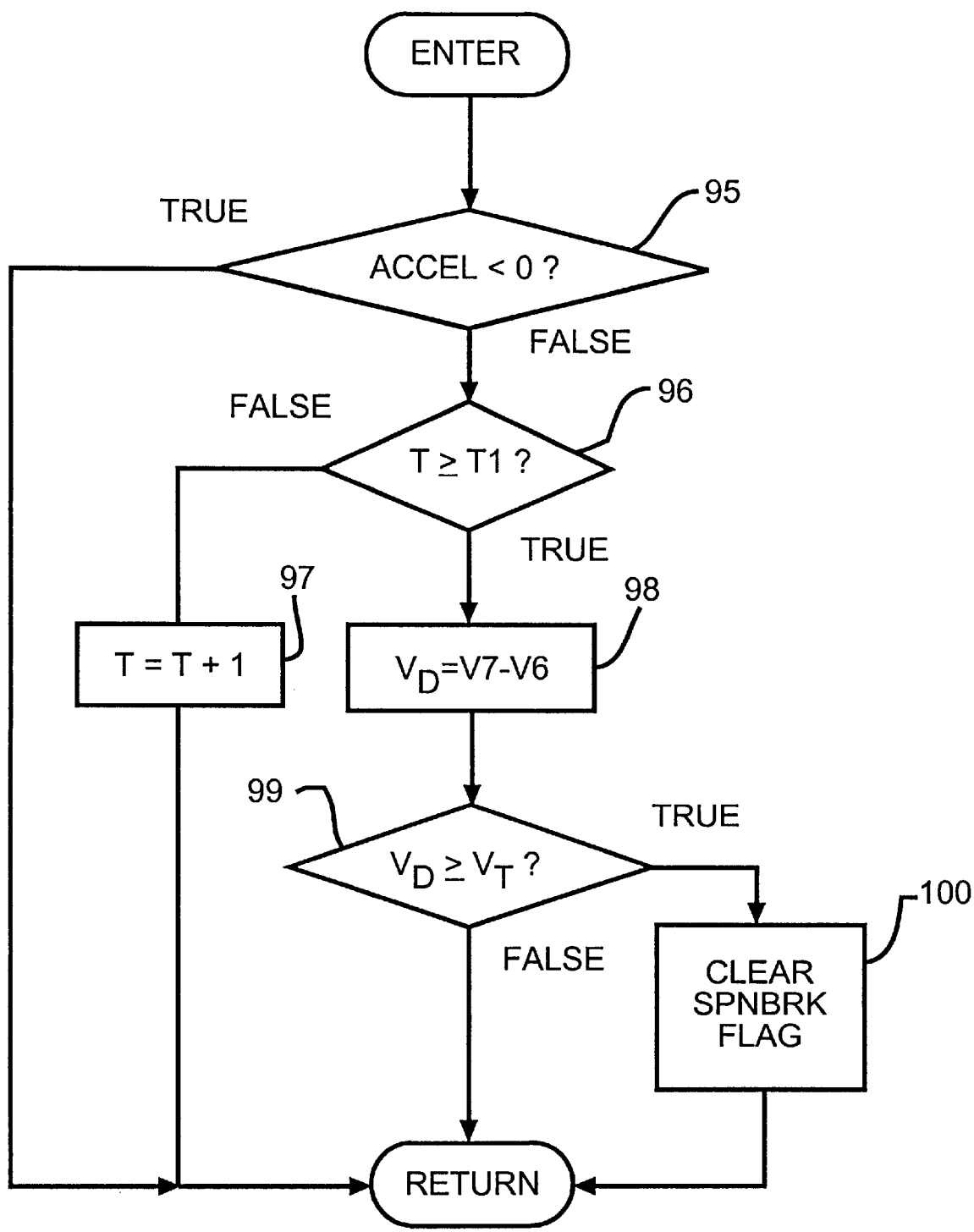
FIG. 5 is a flow chart of a subroutine for the present invention.

A simplified flow chart illustrating the basic operation of a spin and brake verification subroutine is shown in FIG. 5. The subroutine is included as a portion of a RWAL control algorithm. The subroutine is called during each iteration of the main RWAL system control algorithm. It will be appreciated that the subroutine shown in FIG. 5 is intended to be exemplary and that the invention can be implemented with other subroutines which differ from the structure shown in the flow chart in FIG. 5. Additionally, some of the functions shown in the flow chart may be included in the RWAL control algorithm. Similarly, it will be appreciated that the invention also can be practiced with a plurality of subroutines which are called individually by the RWAL control algorithm.

In FIG. 5, it is assumed that the SPNBRK flag has been set TRUE and that the rear wheels are undergoing a wheel speed excursion which has triggered an anti-lock brake response. In decision block 95, the rear wheel acceleration is compared to zero. If the rear wheel acceleration is less than zero, that is, the rear wheels are continuing to decelerate, the subroutine returns to the main RWAL control algorithm. If the rear wheel acceleration is zero, or greater than zero, as would occur if the rear wheels are accelerating, the subroutine starts a counter T (not shown) and continues to decision block 96. In subsequent iterations, the step of initializing the counter T is bypassed.

In decision block 96, the counter T is compared to a parameter T1 which corresponds to the predetermined time period $T_P$, which was described above. If the counter has not reached T1, the counter T is indexed by one in functional block 97 and the subroutine returns to the main RWAL control algorithm. If the counter T has reached or exceeded T1, the subroutine continues to functional block 98 where the difference in rear wheel speeds $V_D$ is calculated by subtracting the rear wheel speed at the beginning of the time period V6 from the present wheel speed V7. The subroutine then continues to decision block 99.

In decision block 99, the difference in rear wheel speeds $V_D$ is compared to the rear wheel speed increase threshold, $V_T$. If the difference in rear wheel speeds $V_D$ is greater than or equal to the threshold $V_T$, it is an indication that the spin-and-brake mode no longer applies and the subroutine continues to functional block 100 where the SPNBRK flag is cleared. The subroutine then returns to the main RWAL control algorithm which will implement a normal RWAL braking cycle. If the difference in rear wheel speeds $V_D$ is less than the threshold $V_T$ in decision block 99, the subroutine returns to the main RWAL control algorithm without clearing the SPINBRK flag. Accordingly, the RWAL control algorithm will implement the spin-and-brake mode of operation which was described above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the preferred embodiment of the invention has been illustrated and described for a RWAL system, it will be appreciated that the invention also can be practiced with a conventional anti-lock brake system which controls all the vehicle wheel brakes.

What is claimed is:

1. An anti-lock brake system for a vehicle having at least one wheel brake connected to a master cylinder, the anti-lock brake system comprising:

an isolation valve connected between the master cylinder and the controlled wheel brake;

a dump valve connected to the wheel brake;

a speed sensor for monitoring the speed of a wheel associated with the controlled wheel brake;

a controller electrically coupled to said isolation and dump valves and said speed sensor, said controller being operative, following detection of an over-speed condition of said wheel associated with the controlled wheel brake and an actuation of the controlled wheel brake which causes a deceleration of said wheel which is indicative of a potential lock-up condition of said wheel, to selectively open said dump valve and monitor the deceleration of said wheel associated with said controlled wheel brake, said controller being further operative, upon detection of a predetermined deceleration value, to monitor the speed of said wheel associated with said controlled wheel brake for a predetermined time period, said controller then being operative, following said predetermined time period to calculate a change in the speed of said controlled wheel over said predetermined time period and to compare said change in wheel speed to a predetermined wheel speed change threshold to determine if a spin-and-brake condition exists at said wheel.

2. The anti-lock brake system according to claim 1 wherein said controller is operative upon said detection of an over-speed condition of said wheel associated with said controlled wheel brake to set a spin-and-brake flag.

3. The anti-lock brake system according to claim 1 wherein said detection of said over-speed condition includes said controller sensing an acceleration of said wheel associated with the controlled wheel brake which exceeds a predetermined acceleration threshold for a period of time in excess of a predetermined time period.

4. The anti-lock brake system according to claim 3 wherein said predetermined deceleration is zero.

5. The anti-lock brake system according to claim 4 wherein said wheel speed change threshold is positive to be indicative of an accelerating wheel.

6. The anti-lock brake system according to claim 5 wherein said controller is operative upon determining that said change in controlled wheel speed is less than said wheel speed change threshold to implement a spin-and-brake control algorithm for controlling the rear wheel.

7. The anti-lock brake system according to claim 5 wherein said controller is operative upon determining that said change in controlled wheel speed is greater than said wheel speed change threshold to implement a normal anti-lock brake cycle.

8. The anti-lock brake system according to claim 7 wherein the controlled wheel brake is a rear wheel brake.

9. The anti-lock brake system according to claim 8 wherein said controller includes a microprocessor having a memory, said memory including an algorithm for calculating said change in controlled wheel speed and comparing said change to said wheel speed change threshold.

10. The anti-lock brake system according to claim 9 wherein said microprocessor is further operative to selectively open said isolation valve to cause a speed departure of said wheel associated with said controlled wheel brake and then to subsequently open said dump valve to correct said wheel speed departure.

11. The antilock brake system according to claim 5 wherein said controller is operative upon said detection of an over-speed condition of said wheel associated with said controlled wheel brake to set a spin-and-brake flag and further wherein said controller is operative upon determining that said change in controlled wheel speed is greater than said wheel speed change threshold to clear said spin-and-brake flag.

* * * * *